United States Patent [19]

Marder

[11] Patent Number: 5,682,002

[45] Date of Patent: Oct. 28, 1997

[54] SCREWED INSTRUMENTATION FITTING

[75] Inventor: Michael Marder, Höchenschwand, Germany

[73] Assignee: Asea Brown Boveri AG, Baden, Switzerland

[21] Appl. No.: 715,412

[22] Filed: Sep. 18, 1996

[30] Foreign Application Priority Data

Oct. 26, 1995 [DE] Germany ............. 195 39 782.7

[51] Int. Cl.$^6$ .......................................... G01M 19/00
[52] U.S. Cl. .......................................... 73/866.5
[58] Field of Search ................... 73/866.5, 863.85, 73/756; 356/241; 277/115, 215, 190, 191, 198, 2

[56] References Cited

U.S. PATENT DOCUMENTS

| | | | |
|---|---|---|---|
| 733,588 | 7/1903 | Janda | 277/115 |
| 3,047,298 | 7/1962 | St Clair et al. | 277/115 |
| 3,753,569 | 8/1973 | Bonomi | 277/190 |
| 4,011,017 | 3/1977 | Feuerstein et al. | 277/2 |
| 4,569,228 | 2/1986 | Bellgardt et al. | 73/866.5 |

FOREIGN PATENT DOCUMENTS

4308720A1 9/1994 Germany.

Primary Examiner—Robert Raevis
Attorney, Agent, or Firm—Burns, Doane, Swecker & Mathis, L.L.P.

[57] ABSTRACT

The object of the invention is to provide a novel pressure-tight screwed instrumentation fitting for a pressure vessel, which screwed instrumentation fitting has, for acceptable material costs, both a low assembly cost and a small space requirement and in which the measuring lines are not damaged.

According to the invention this is achieved by two axial stops (24, 25) being formed in the cap nut (13) and by a third axial stop (26) being formed in the screw-in socket (10). The cap nut (13) and the screw-in socket (10) form a common interior space (15) which is bounded axially by the second and third stops (25, 26) and in which a multi-piece sealing insert (16) is arranged. The latter consists of a pressure-bearing front part (17), an end plate (18), a sealing sleeve (19) in between with a sealing element (20) arranged therein, and also the clamping ring (21). Both the sealing sleeve (19) and the sealing element (20) are produced from a sufficiently heat-resistant, deformable material, preferably steatite. The clamping ring (21) is supported on the sealing sleeve (19). Radial slots (29) corresponding to the size, shape and number of measuring lines (6) are formed and axially oriented with respect to one another in the front part (17), in the end plate (18) and in the sealing element (20).

6 Claims, 2 Drawing Sheets 5,682,002

1

SCREWED INSTRUMENTATION FITTING

BACKGROUND OF THE INVENTION

1. Field of the Invention

The invention relates to a screwed instrumentation fitting for leading measuring lines out of a pressure vessel.

2. Discussion of Background

In particular in the new development of thermal turbomachines, extensively instrumented test carriers are used. The measuring lines used, such as thermocouples or pressure measuring lines for example, must be led out of the respective test carrier, i.e. the pressure vessel. Such measuring lines are also used in standard equipment. Clamping-ring screwed fittings or flange connections having relatively thick seals are known for leading the measuring lines out of the pressure vessel.

The known clamping-ring screwed fittings consist of a screw-in socket having a thread on both sides and a cap nut, in the interior space of which a conical clamping ring is arranged. In addition, the interior space has a corresponding bearing surface, and the cap nut has an axial stop for the clamping ring. If the cap nut is screwed onto the screw-in socket, its axial stop presses the clamping ring against the conical bearing surface of the screw-in socket. The clamping ring is thereby pressed against the measuring line, which fixes the latter axially in the screwed fitting. The sealing capacity of such screwed fittings can be described as good. However, an adverse effect is that in each case only one measuring line can be screwed to the pressure vessel. In addition, the measuring line can be damaged by the clamping ring. Therefore this screwed fitting requires considerable material and is also time-consuming. It is therefore only used for smaller instrumentation having less than 30 measuring lines.

In contrast, often up to 40 measuring lines per flange connection are led out of the pressure vessel, which results in a distinct reduction in the material costs. The assembly cost can also be reduced compared with the clamping-ring screwed fitting. However, it is still relatively high. As a result of being bent over the flange, the measuring lines can be damaged even in this connection variant. In addition, considerable leakage problems occur.

When the measuring lines are being assembled, they are as a rule led out of the pressure vessel with the already assembled plugs or couplings. In order to permit this, the known instrumentation leadthroughs must be of larger dimensions than would be necessary for leading through the lines. In addition, both variants require in any case a considerable amount of space, the clamping-ring screwed fitting on account of the large number of individual screwed fittings and the flange connection on account of the large sealing area required for the sealing.

SUMMARY OF THE INVENTION

Accordingly, one object of the invention, in attempting to avoid all these disadvantages, is to provide a novel pressure-tight screwed instrumentation fitting for a pressure vessel, which screwed instrumentation fitting has, for acceptable material costs, both a low assembly cost and a small space requirement and in which the measuring lines are not damaged.

According to the invention, this is achieved in a device according to the preamble of claim 1 by both the axial stop for the clamping ring and a second axial stop being formed in the cap nut. The latter stop has a smaller inside diameter than the first stop. A third axial stop is formed in the screw-in socket. The cap nut and the screw-in socket form a common interior space bounded axially by the second and third stops. A multi-piece sealing insert is arranged in the interior space. Said sealing insert consists of a pressure-bearing front part, an end plate, a sealing sleeve in between, a sealing element arranged in and corresponding to the sealing sleeve, and also a clamping ring. Both the sealing sleeve and the sealing element are made of a deformable material which is sufficiently heat-resistant in accordance with the temperatures prevailing in the pressure vessel. The clamping ring is supported at least partly on the sealing sleeve. The second stop corresponds to the end plate and the third stop corresponds to the front part. Radial slots corresponding to the size, shape and number of measuring lines are formed in the front part, in the end plate and in the sealing element, which slots are axially oriented to one another.

In accordance with the size of the screwed instrumentation fitting and the number of radial slots, quite a number of measuring lines can advantageously be led out of a single opening of the pressure vessel with this solution. Compared with the clamping-ring screwed fitting, this means a considerable reduction in the number of screwed fittings, i.e. a decisive reduction in the assembly cost. The space requirement is also reduced on account of the distinctly smaller number of screwed fittings. On account of the diameter of the screwed instrumentation fitting necessary for accommodating a plurality of measuring lines, it is possible to lead out the measuring lines with the already assembled plugs or couplings, which further reduces the assembly cost. Since the sealing is effected in the interior of the screwed fitting, this can also be realized with substantially greater accuracy and with a greater saving of space than by means of a flange connection. It is especially advantageous that the measuring lines are led out of the pressure vessel in a straight line and without kinks and do not come into contact with the clamping ring. Damage to the measuring lines is thereby prevented.

A further advantage is the function separation between the pressure-bearing and sealing components of the sealing insert, i.e. between the front part and the sealing sleeve including the sealing element. This is the only way that these components can be designed in accordance with their specific function. The sealing sleeve and the sealing element are therefore made of a deformable material which is sufficiently heat-resistant in accordance with the desired temperature of the pressure vessel. The screwed instrumentation fitting can therefore be used in a wide variety of applications. Steatite is used for this purpose at operating temperatures above 500° C., rubber is used at temperatures below 100° C. and pure graphite is used in the intermediate range from 100° C. to 500° C. Each of these materials is deformable in the specified temperature range to such an extent that it intimately encloses and thus seals off the measuring lines.

It should especially be emphasized that, with the clamping ring, the sealing sleeve and the sealing element, the most inexpensive elements of the screwed instrumentation fitting are wearing parts and the remaining components can be reused.

Furthermore, it is advantageous if the end plate consists of two plate sections of different outside diameter, the plate section of smaller outside diameter bearing against the sealing sleeve and the plate section of larger outside diameter bearing against the second stop. On account of this design, axial locking for both the sealing element and the clamping ring is already ensured during the assembly.

Finally, twelve slots are formed in the front part, in the end plate and in the sealing element respectively and are uniformly distributed at their periphery. The measuring lines can thereby be arranged uniformly in the screwed fitting, which substantially facilitates their assembly.

BRIEF DESCRIPTION OF THE DRAWINGS

A more complete appreciation of the invention and many of the attendant advantages thereof will be readily obtained as the same becomes better understood by reference to the following detailed description of a screwed instrumentation fitting for a combustion chamber when considered in connection with the accompanying drawings, wherein.

Only the elements essential for understanding the invention are shown. The interior space of the combustion chamber and the measuring instruments connected to the measuring lines, for example, are not shown.

DESCRIPTION OF THE PREFERRED EMBODIMENTS

Figure 1:
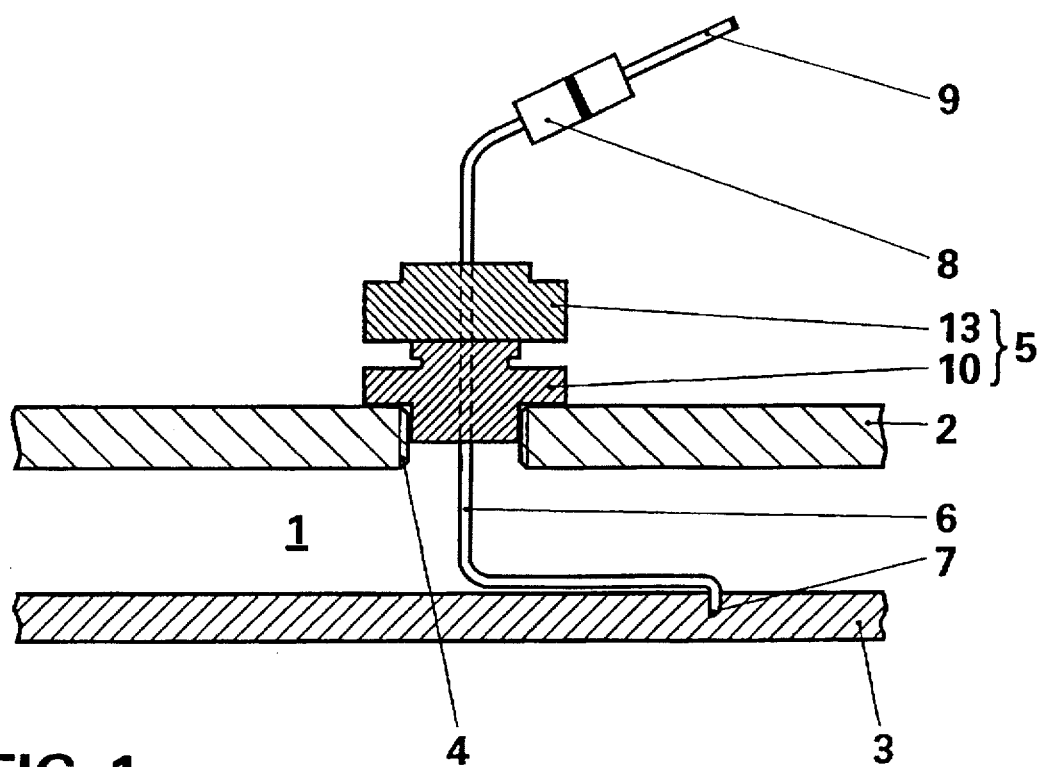
FIG. 1 shows a representation of the arrangement of the screwed instrumentation fitting in the combustion chamber.

Referring now to the drawings, wherein like reference numerals designate identical or corresponding parts throughout the several views, FIG. 1 shows a detail of the pressure vessel 1 designed as a combustion chamber, having a casing 2 and an inner liner 3. A screwed instrumentation fitting 5 is arranged in a tapped hole 4 in the casing 2. The screwed instrumentation fitting 5 accommodates twelve measuring lines 6, of which only one is shown for the sake of clarity. The inner end of the measuring lines 6 in each case forms a measuring point 7 in the liner 3. The outer end is connected to a compensating line 9 via a coupling 8 designed as a plug, which compensating line 9 leads to a measuring instrument (not shown).

Figure 2:
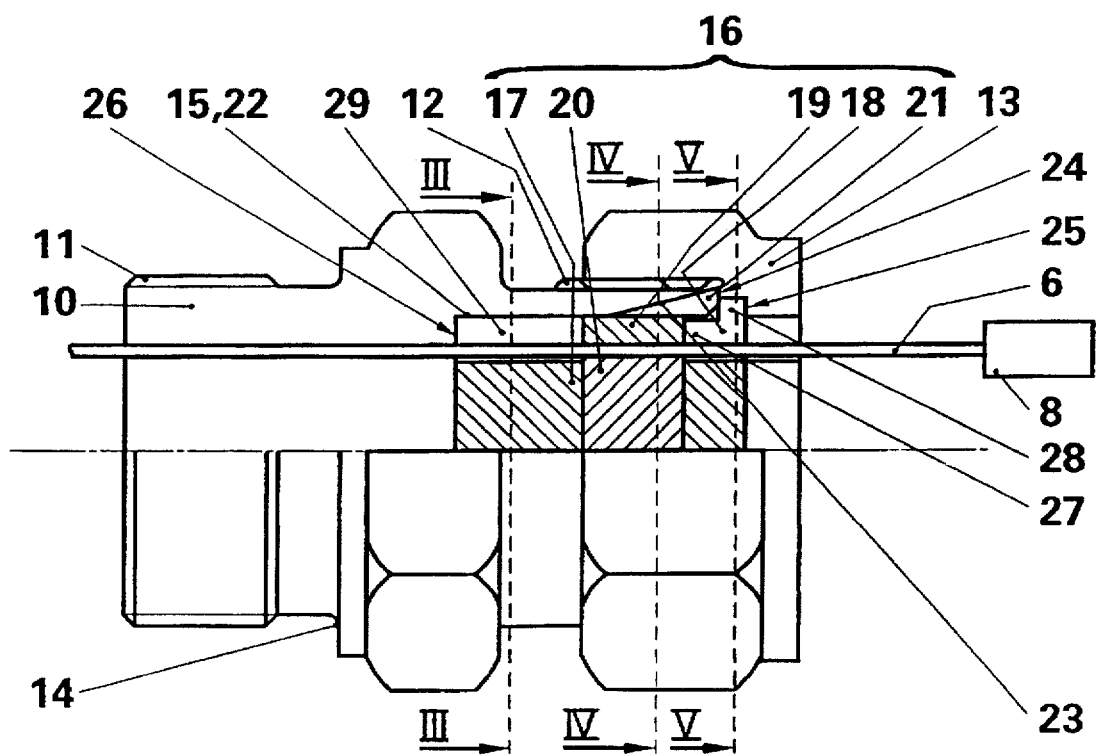
FIG. 2 shows a longitudinal section through the screwed fitting, shown enlarged and rotated through 90°.

The screwed instrumentation fitting 5 consists of a screw-in socket 10 having two external threads 11, 12 and a cap nut 13 (FIG. 2). The first external thread 11 is connected to the tapped hole 4 in the casing 2 and the second external thread 12 is connected to the cap nut 13. A sealing means 14 designed as a sealing edge is arranged between the screw-in socket 10 and the casing 2 of the combustion chamber 1. The cap nut 13 and the screw-in socket 10 form a common interior space 15 in which a multi-piece sealing insert 16 is arranged. The latter comprises a pressure-bearing front part 17, an end plate 18, a sealing sleeve 19 in between, a sealing element 20 arranged in the sealing sleeve 19 and corresponding to the latter, and also a conical clamping ring 21. Both the sealing sleeve 19 and the sealing element 20 are produced from steatite. The screw-in socket 10 has a cylindrical inner surface 22 which runs out in the direction of the cap nut 13 into a conical bearing surface 23 for the clamping ring 21.

The screwed instrumentation fitting 5 has a first axial stop 24 for the clamping ring 21 and a second axial stop 25. Both stops 24, 25 are designed as inner shoulders of the cap nut 13, the latter stop 25 having a smaller inside diameter than the first stop 24. A third axial stop 26 is formed in the screw-in socket 10. The common interior space 15 of cap nut 13 and screw-in socket 10 is axially bounded by the second and third stops 25, 26.

The clamping ring 21 is supported at least partly on the sealing sleeve 19. The second stop 25 corresponds to the end plate 18, and the third stop 26 corresponds to the front part 17 of the sealing insert 16. The end plate 18 comprises two plate sections 27, 28 of different outside diameter, the plate section 27 provided with a smaller outside diameter bearing axially against the sealing sleeve 19, and the plate section 28 formed with a larger outside diameter bearing axially against the second stop 25. The front part 17 and the sealing sleeve 19 are of equally large outside diameter and correspond to the inner surface 22 or via the clamping ring 21 to the bearing surface 23 of the screw-in socket 10. The outside diameter of the plate section 27 of the end plate 18 is about 0.1 mm smaller than the inside diameter of the clamping ring 21, so that there is a radial clearance relative to the clamping ring 21 when the plate 18 is assembled.

Figure 3:
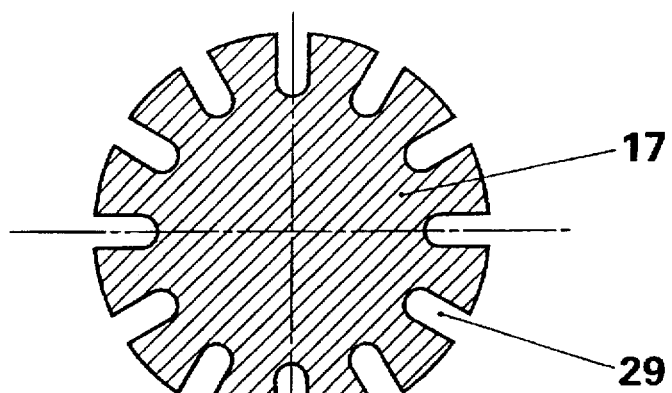
FIG. 3 shows a section III—III through the front part of the sealing insert.
Figure 4:
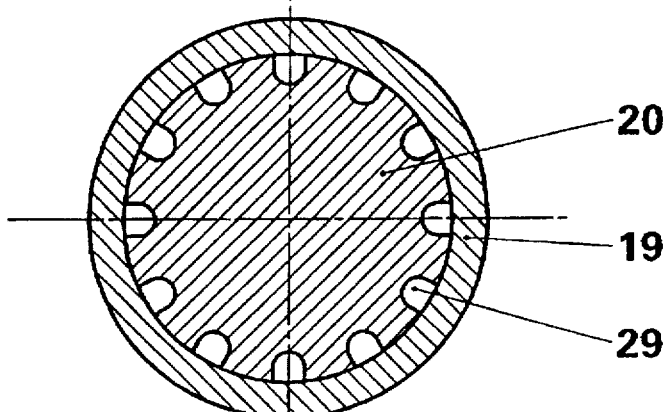
FIG. 4 shows a section IV—IV through the sealing sleeve and the sealing element corresponding to it.
Figure 5:
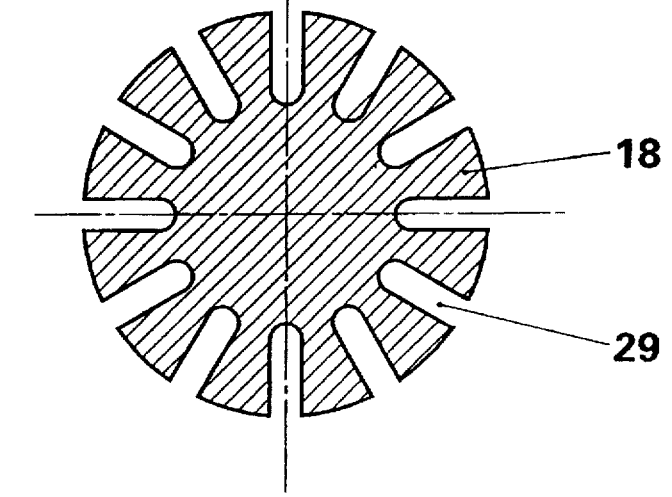
FIG. 5 shows a section V—V through the end plate in the region of its plate section of larger outside diameter.

Twelve radial slots 29, corresponding to the size and shape of the measuring lines 6, are formed and axially oriented with respect to one another in the front part 17, in the end plate 18 and in the sealing element 20 respectively (FIGS. 3 to 5). The width and the depth of the slots 29 of the sealing element 20 are formed in such a way that the corresponding measuring lines are accommodated in a flush position. In contrast, the slots 29 of the front part 17 and end plate 18 are wider and deeper so that the measuring lines 6 have some clearance there relative to the slots 29.

Depending on the number of measuring lines 6 to be accommodated, a larger or smaller number of radial slots 29 may of course be formed. Accordingly, either the distance between the slots 29 is varied or a screwed instrumentation fitting 5 of larger or smaller dimensions is used.

When the screwed instrumentation fitting 5 is assembled, first of all the screw-in socket 10 is screwed into the tapped hole 4 in the casing 2 of the combustion chamber 1. It is thereby metallically sealed off from the combustion chamber 1 by means of the sealing edge 14. The measuring lines 6 are then passed through the screw-in socket 10 and out of the combustion chamber 1. Then, with the measuring lines 6 arranged uniformly at the periphery, first the slotted part 17 and then the sealing sleeve 19 together with the clamping ring 21 are pushed into the screw-in socket 10.

After that, the sealing element 20 is pressed into a flush position in the sealing sleeve 19, as a result of which the measuring lines 6 are already lightly fixed. The end plate 18 is then put on and the cap nut 13 is lightly screwed on by hand. Both the sealing element 20 and the clamping ring 21 are thus secured against axial slipping and against canting. Finally, the cap nut 13 is tightened onto the screw-in socket 10, in the course of which the entire sealing insert 16 is compressed.

During the tightening of the cap nut 13, its first stop 24 presses the conical clamping ring 21 against the likewise conical bearing surface 23 of the screw-in socket 10. In the course of this, the clamping ring 21 is radially compressed and in turn presses the sealing sleeve 19 radially against the sealing element 20. The measuring lines 6 located in between are intimately enclosed and sealed off by the displaced steatite without damage. Due to its high surface pressure on the conical bearing surface 23 of the screw-in socket 10, the clamping ring 21 at the same time secures the entire screwed instrumentation fitting against rotation. Therefore no separate anti-rotation locking means is necessary. The second stop 25 finally strikes the plate section 28 of the end plate 18 and presses the entire sealing insert 16 against the third stop 26 arranged in the screw-in socket 10. In the course of this, the sealing insert 16 is pushed together axially so that it assumes its end position in the screwed instrumentation fitting 5.

The dismantling of the screwed instrumentation fitting 5 takes place in the reverse sequence. The clamping ring 21, the sealing sleeve 19 and the sealing element 20 are wearing parts, which are replaced each time before the screwed instrumentation fitting 5 is reassembled.

On account of its heat resistance of over 1000° C., the material of sealing sleeve 19 and sealing element 20, the soft, deformable steatite, is especially suitable as sealing material for screwed instrumentation fittings 5 on a combustion chamber 1. Such a screwed instrumentation fitting 5 may of course also be used for the high-pressure part of a gas turbine or for exhaust-gas turbochargers.

If temperatures below 100° C. are to be expected in the region of the screwed fitting, such as in the low-pressure part of a steam turbine for example, rubber may be used as the sealing material. In gas compressors having temperatures of 100° C. to 500° C., pure graphite is used.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A screwed instrumentation fitting (5) for the fastening of at least one measuring line (6), to be led out of a pressure vessel (1), in a casing (2) of the pressure vessel (1), comprising a) a screw-in socket (10) having two external threads (11, 12) and a cap nut (13), the first external thread (11) being connected to a tapped hole (4) in the casing (2) and the second external thread (12) being connected to the cap nut (13), b) a sealing means (14) between the screw-in socket (10) and the casing (2), c) a conical clamping ring (21), arranged in the interior of the screwed instrumentation fitting (5), as well as an axial stop (24) and a conical bearing surface (23) for the clamping ring (21), wherein d) the axial stop (24) for the clamping ring (21) and a second axial stop (25) are formed in the cap nut (13), the latter stop (25) having a smaller inside diameter than the first stop (24), e) a third axial stop (26) is formed in the screw-in socket (10), f) the cap nut (13) and the screw-in socket (10) form a common interior space (15) bounded axially by the second and third stops (25, 26), g) a multi-piece sealing insert (16) is arranged in the interior space (15), which sealing insert (16) comprises a pressure-bearing front part (17), an end plate (18), a sealing sleeve (19) in between, a sealing element (20) arranged in and corresponding to said sealing sleeve (19), and also the clamping ring (21), h) both the sealing sleeve (19) and the sealing element (20) are made of a deformable material which is sufficiently heat-resistant in accordance with the temperatures prevailing in the pressure vessel (1), i) the clamping ring (21) is supported at least partly on the sealing sleeve (19), j) the second stop (25) corresponds to the end plate (18) and the third stop (26) corresponds to the front part (17), k) radial slots (29) corresponding to the size, shape and number of measuring lines (6) are formed and axially oriented with respect to one another in the front part (17), in the end plate (18) and in the sealing element (20).

2. The screwed instrumentation fitting as claimed in claim 1, wherein the end plate (18) comprises two plate sections (27, 28) of different outside diameter, the plate section of smaller outside diameter (27) bearing against the sealing sleeve (19) and the plate section of larger outside diameter (28) bearing against the second stop (25).

3. The screwed instrumentation fitting as claimed in claim 1, wherein the sealing sleeve (19) and the sealing element (20) are made of steatite.

4. The screwed instrumentation fitting as claimed in claim 1, wherein the sealing sleeve (19) and the sealing element (20) are made of pure graphite.

5. The screwed instrumentation fitting as claimed in claim 1, wherein the sealing sleeve (19) and the sealing element (20) are made of rubber.

6. The screwed instrumentation fitting as claimed in claim 1, wherein twelve slots (19) are arranged in the front part (17), in the end plate (18) and in the sealing element (20) respectively and are uniformly distributed at their periphery.

* * * * *